United States Patent
Huang et al.

(10) Patent No.: US 12,236,150 B2
(45) Date of Patent: Feb. 25, 2025

(54) DISPLAY INTERFACE SWITCHING METHOD AND APPARATUS, AND WEARABLE DEVICE BODY AND WEARABLE DEVICE

(71) Applicant: GOERTEK INC., Shandong (CN)

(72) Inventors: Shiting Huang, Shandong (CN); Zhongyan Zhang, Shandong (CN); Dezhi Zhou, Shandong (CN); Xinyan Li, Shandong (CN); Xingyu Gao, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/562,362

(22) PCT Filed: Oct. 22, 2021

(86) PCT No.: PCT/CN2021/125772
§ 371 (c)(1),
(2) Date: Nov. 20, 2023

(87) PCT Pub. No.: WO2022/247122
PCT Pub. Date: Dec. 1, 2022

(65) Prior Publication Data
US 2024/0241683 A1   Jul. 18, 2024

(30) Foreign Application Priority Data

May 26, 2021   (CN) .......................... 202110578480.X

(51) Int. Cl.
G06F 3/14       (2006.01)
G04G 21/04      (2013.01)
(Continued)

(52) U.S. Cl.
CPC ............... *G06F 3/14* (2013.01); *G04G 21/04* (2013.01); *G06F 1/163* (2013.01); *G06F 9/451* (2018.02)

(58) Field of Classification Search
CPC .......... G06F 3/14; G06F 1/163; G06F 1/1698; G06F 9/451; G04G 21/04
(Continued)

(56) References Cited

U.S. PATENT DOCUMENTS

2015/0378938 A1* 12/2015 Lyman ................ G06F 11/3051
                                                                710/8
2016/0070367 A1   3/2016 Lin
(Continued)

FOREIGN PATENT DOCUMENTS

CN       104461004 A      3/2015
CN       108272182 A      7/2018
(Continued)

OTHER PUBLICATIONS

International Search Report from International Application No. PCT/CN2021/125772 mailed Feb. 28, 2022.

*Primary Examiner* — Tom V Sheng
(74) *Attorney, Agent, or Firm* — Shih IP Law Group, PLLC.

(57) ABSTRACT

Disclosed are a display interface switching method and apparatus, a wearable device body, a wristband component, a wearable device and a computer-readable storage medium. The method is applied to a wearable device body, and comprises: coupling a first wireless communication transceiver with a second wireless communication transceiver in a wristband component, for acquiring interface information sent by the second wireless communication transceiver, wherein the first wireless communication transceiver is disposed in a wearable device body (S101); and switching a display interface of the wearable device body to an interface
(Continued)

corresponding to the interface information (S102). According to the method, the wearable device body can automatically switch the display interface to an interface corresponding to the approaching coupled wristband component, thereby improving the interchangeability of display interfaces of the wristband component and the wearable device body, and thus improving the usage experience of a user.

10 Claims, 5 Drawing Sheets

(51) Int. Cl.
  *G06F 1/16* (2006.01)
  *G06F 9/451* (2018.01)
(58) Field of Classification Search
  USPC .......................................................... 345/156
  See application file for complete search history.

(56) References Cited

U.S. PATENT DOCUMENTS

| | | | |
|---|---|---|---|
| 2016/0150398 A1* | 5/2016 | Huang | H04W 12/33 455/418 |
| 2017/0109019 A1* | 4/2017 | Lei | G06F 3/04842 |
| 2017/0164291 A1* | 6/2017 | Ludwig | H04W 4/80 |
| 2018/0103859 A1* | 4/2018 | Provenzano | A61B 5/0024 |
| 2018/0206281 A1* | 7/2018 | Zhang | H04W 84/20 |
| 2019/0239060 A1* | 8/2019 | Yoon | G06F 1/163 |
| 2021/0050882 A1* | 2/2021 | Jia | H04B 5/79 |
| 2022/0092960 A1* | 3/2022 | Arumugam | H04W 4/80 |
| 2022/0114905 A1* | 4/2022 | Shiffman | A63F 13/25 |
| 2023/0333850 A1* | 10/2023 | Liu | G06F 1/163 |

FOREIGN PATENT DOCUMENTS

| | | |
|---|---|---|
| CN | 109062637 A | 12/2018 |
| CN | 111796892 A | 10/2020 |
| CN | 112558843 A | 3/2021 |
| CN | 113220402 A | 8/2021 |

* cited by examiner

DISPLAY INTERFACE SWITCHING METHOD AND APPARATUS, AND WEARABLE DEVICE BODY AND WEARABLE DEVICE

The present disclosure claims a priority to the Chinese Patent Application No. 202110578480.X, entitled "display interface switching method and apparatus, and wearable device body and wearable device" filed with China Patent Office on May 26, 2021, the entire contents of which are incorporated into the present disclosure by reference.

TECHNICAL FIELD

The present disclosure relates to a technical field of wearable devices, and more particularly, to a display interface switching method, a display interface switching method apparatus, a wearable device body, a wristband component, a wearable device and a computer-readable storage medium.

DESCRIPTION OF RELATED ART

With the development of science and technology in modern society, wearable devices such as smart watches have been upgraded from simple convenience equipment to fashion accessories representing the user's personal style. The wearable devices are generally designed that wristband components are replaceable, such as replaceable straps of the smart watches, so that users may wear the wearable devices in different scenarios. However, when the wristband component is replaced, the display content such as the color and the background of a display interface of the wearable device body (for example, a dial body of the smart watch) often do not match with the wristband component, so that the interchangeability of display interfaces of the wristband component and the wearable device body becomes one of the factors that affect consumers' perception of product use. For example, when the strap of the smart watch is replaced, the dial in the display interface of the smart watch does not match the strap, making the user unwilling to wear it or the user should manually replace the displayed dial.

Therefore, how to improve the interchangeability of display interfaces of the wristband component and the wearable device body so as improve the user experience is an urgent problem to be solved.

SUMMARY

An object of the present disclosure is to provide a display interface switching method, a display interface switching apparatus, a wearable device body, a wristband component, a wearable device and a computer-readable storage medium, aiming at improving the interchangeability of display interfaces of the wristband component and the wearable device body, for improving the user experience.

In order to achieve the above object, the present disclosure provides a display interface switching method, which is applied to a wearable device body, comprising:
  coupling a first wireless communication transceiver with a second wireless communication transceiver in a wristband component, for acquiring interface information sent by the second wireless communication transceiver, wherein the first wireless communication transceiver is disposed in the wearable device body; and
  switching a display interface of the wearable device body to an interface corresponding to the interface information.

Optionally, coupling a first wireless communication transceiver with a second wireless communication transceiver in a wristband component, for acquiring interface information sent by the second wireless communication transceiver, comprises:
  if the coupled second wireless communication transceiver is sensed by the first wireless communication transceiver, sending an interface information request to the second wireless communication transceiver by the first wireless communication transceiver; and
  receiving the interface information sent back from the second wireless communication transceiver by using the first wireless communication transceiver.

Optionally, when the first wireless communication transceiver includes a plurality of wireless coils, if the coupled second wireless communication transceiver is sensed by the first wireless communication transceiver, sending an interface information request to the second wireless communication transceiver by the first wireless communication transceiver, comprises:
  if the coupled second wireless communication transceiver is sensed by a target coil of the first wireless communication transceiver, sending the interface information request to the second wireless communication transceiver by the target coil, wherein the target coil is any one of the plurality of wireless coils, and the second wireless communication transceiver is coupled with the target coil.

Optionally, when the interface information includes an interface identifier, switching a display interface of the wearable device body to an interface corresponding to the interface information includes:
  searching for interface data corresponding to the interface identifier in a storage space of the wearable device body; and
  switching the display interface of the wearable device body to an interface corresponding to the interface data.

Optionally, after switching a display interface of the wearable device body to an interface corresponding to the interface information, the method further comprises:
  turning off a display interface switching function of the wearable device body, so as to turn off a communication between the first wireless communication transceiver and the second wireless communication transceiver.

The present disclosure also provides a display interface switching apparatus, which is applied to a wearable device body, including:
  a wireless acquisition module configured to couple a first wireless communication transceiver with a second wireless communication transceiver in a wristband component, for acquiring interface information sent by a second wireless communication transceiver in a wristband component, wherein the first wireless communication transceiver is disposed in the wearable device body; and
  an interface switching module configured to switch a display interface of the wearable device body to an interface corresponding to the interface information.

The present disclosure also provides a wearable device body, including a first wireless communication transceiver, a processor and a memory,
  wherein the memory is configured to store a computer program, and
  wherein the processor is configured to implement steps of the display interface switching method as described above when executing the computer program.

The present disclosure also provides a wristband component, including:

a second wireless communication transceiver configured to send stored interface information to a first wireless communication transceiver in a wearable device body after the second wireless communication transceiver is coupled with the first wireless communication transceiver, so as to switch a display interface of the wearable device body to an interface corresponding to the interface information.

The present disclosure also provides a wearable device, comprising the above-mentioned wearable device body and the above-mentioned wristband component.

The present disclosure also provides a computer-readable storage medium, on which a computer program is stored, wherein when the computer program is executed by a processor, the steps of the above-mentioned display interface switching method are implemented.

The display interface switching method provided by the present disclosure, which is applied to a wearable device body, comprises: coupling a first wireless communication transceiver with a second wireless communication transceiver in a wristband component, for acquiring interface information sent by the second wireless communication transceiver, wherein the first wireless communication transceiver is disposed in the wearable device body; and switching a display interface of the wearable device body to an interface corresponding to the interface information.

According to the present disclosure, the interface information sent by the coupled second wireless communication transceiver in the wristband component is received in a wireless transmission manner by using the first wireless communication transceiver disposed in the wearable device body, such that the wearable device body can automatically switch the display interface to an interface corresponding to the approaching coupled wristband component, thereby improving the interchangeability of display interfaces of the wristband component and the wearable device body, and thus improving the usage experience of a user. In addition, the present disclosure also provides a display interface switching apparatus, a wearable device body, a wristband component, a wearable device and a computer-readable storage medium, which also have the above beneficial effects.

BRIEF DESCRIPTION OF DRAWINGS

In order to more clearly illustrate the technical solutions in the embodiments of the present disclosure or the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

DETAILED DESCRIPTIONS

In order to make the purposes, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are part of, not all of the embodiments of the present disclosure. Based on the embodiments in the disclosure, all embodiments obtained by those of ordinary skill in the art without any creative effort fall within the protection scope of the present disclosure.

Figure 1:
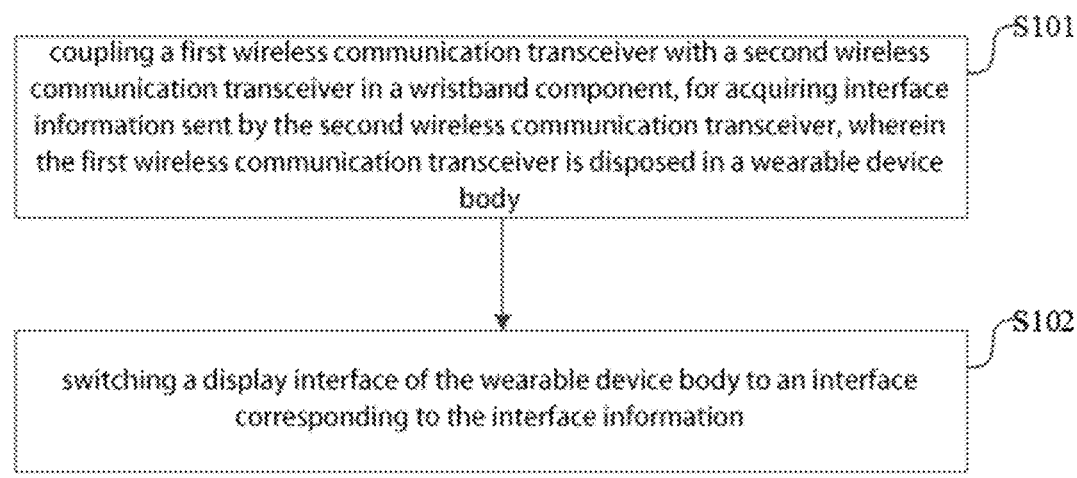
FIG. 1 is a flowchart of a display interface switching method provided by an embodiment of the present disclosure.

Referring to FIG. 1, FIG. 1 is a flowchart of a display interface switching method provided by an embodiment of the present disclosure. The method is applied to a wearable device body, may comprise:

S101: coupling a first wireless communication transceiver with a second wireless communication transceiver in a wristband component, for acquiring interface information sent by the second wireless communication transceiver, wherein the first wireless communication transceiver is disposed in the wearable device body.

It will be understood that the wearable device body in the embodiment may be a main body of the wearable device worn on the wrist, such as the main bodies of a smart watch and a smart bracelet. The wristband component in the embodiment may be a component that can be used in conjunction with the wearable device body, so that the wearable device body can be worn on the wrist, such as a replaceable strap of a smart watch and a replaceable ring strap of a smart bracelet.

Specifically, the first wireless communication transceiver in the embodiment may be a wireless communication transceiver disposed in the wearable device body, and the second wireless communication transceiver in the embodiment may be a wireless communication transceiver disposed in the wristband component. The specific equipment types of the first wireless communication transceiver and the second wireless communication transceiver in the embodiment, that is, the wireless communication mode between the first wireless communication transceiver and the second wireless communication transceiver after the wireless coil of the first wireless communication transceiver is coupled with the wireless coil of the second wireless communication transceiver, may be set by a designer according to practical scenarios and user needs. For example, both of the first wireless communication transceiver and the second wireless communication transceiver may be Near Field Communication (NFC) communication transceiver, that is, at this step, after the wireless coil of the first wireless communication transceiver in the wearable device body and the wireless coil of the second wireless communication transceiver are coupled, the first wireless communication transceiver may receive the interface information sent by the second wireless communication transceiver by NFC communication. Also, both of the first wireless communication transceiver and the second wireless communication transceiver may be Radio Frequency Identification (RFID) communication transceiver or Near-field magnetic induction (NFMI) communication transceiver, is, that the first wireless communication transceiver may receive the interface information sent by the second wireless communication transceiver by RFID communication or NFMI communication. In addition, the embodiment is not limited thereto, as long as the wearable device body may use the first wireless communication transceiver to couple with the wireless coil of and the second wireless communication transceiver, to receive interface information wirelessly transmitted by the second wireless communication transceiver by the first wireless communication transceiver.

That is, each of the wearable device body and the wristband component in the embodiment is provided with a wireless communication transceiver (namely, the first wireless communication transceiver and the second wireless communication transceiver), and the two wireless communication transceivers may be a Reader (reader or interrogator) in the wearable device body and a Tag (tag) in the wristband component. The Tag (that is, the second wireless communication transceiver) in the wristband component may adopt types such as Passive, Semi-Active or Active, a microchip including a memory (for example, storage interface information), a radio wave transceiver (Transceiver) and a wireless coil may be included in the Tag of these types.

Here, the interface information in this step may be information of an interface that can be displayed by the wearable device body. The specific content of the interface information in this step may be set by the designer or the user according to practical scenarios and user needs. For example, the interface information may be program code data of the interface (i.e. interface data), that is to say, the wearable device body may directly use the obtained program code data of the interface to switch the display interface on the display screen to that interface. Or else, the interface information may also be identification of the program code data of the interface (i.e. interface identification), that is to say, the wearable device body may use the obtained interface identification to search for the program code data of the interface corresponding to the interface identification from the program code of the interface stored in its storage space (such as internal memory), so as to switch the display interface on the display screen to that interface. Further, the interface information may also be download information of the program code data of the interface (i.e. interface download information), that is to say, the wearable device body may use the obtained interface download information, to download the program code data of the interface corresponding to the interface download information directly by the network or by controlling a paired connected terminal (such as a mobile phone), so as to switch the display interface on the display screen to that interface.

Figure 2:
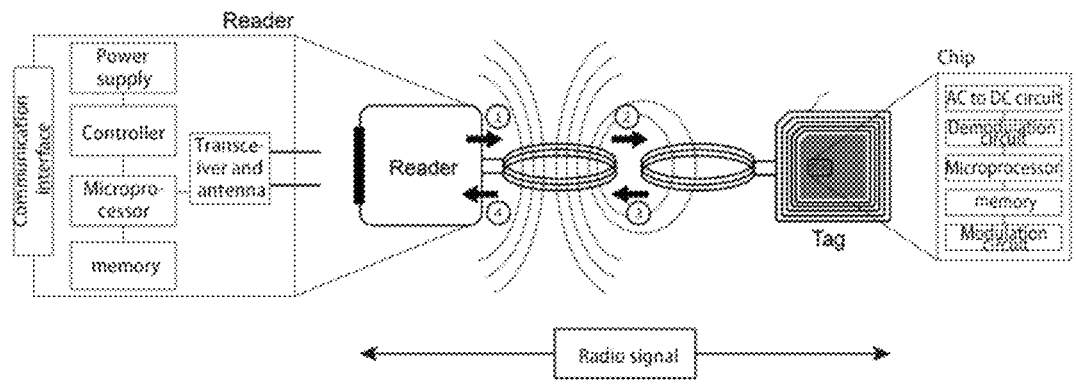
FIG. 2 is a schematic diagram of the principle of another display interface switching method provided by an embodiment of the present disclosure.

It should be noted that in the embodiment, the specific way for the wearable device body to acquire the interface information sent by the second wireless communication transceiver coupling the first wireless communication transceiver with the second wireless communication transceiver in the wristband component, may be set by the designer according to practical scenarios and user needs. For example, if the coupled second wireless communication transceiver is sensed by the first wireless communication transceiver, the wearable device body may send an interface information request to the second wireless communication transceiver by the first wireless communication transceiver, and then receive the interface information sent back from the second wireless communication transceiver by using the first wireless communication transceiver. As illustrated in FIG. 2, the Reader (i.e. the first wireless communication transceiver) in the wearable device body generates radio waves that can be detected by the Tag (i.e. the second wireless communication transceiver) of the wristband by using electromagnetic induction (such as a process ① shown in FIG. 2); when the Tag is close to the Reader, the electromagnetic wave generated by a wireless coil of the Reader will be coupled with a wireless coil of the Tag (such as a process ② shown in FIG. 2); a voltage is generated after the sensing in the Tag and then is rectified (for example, converting AC into DC by an AC-DC circuit), and the power is supplied to an internal circuit of the Tag, that is, a battery may not be provided in the wristband component. The Tag receives the electromagnetic wave signal sent by the Reader (that is, a signal corresponding to the interface information request) by using a wireless coil, and the signal sent by the Reader is decoded (for example, performed by a demodulation circuit and a microprocessor), and the interface information is sent back in an electromagnetic wave signal (process ③ shown in FIG. 2) according to its requirements and is transmitted to the Reader for reading (process ④ shown in FIG. 2). The wearable device body may receive the interface information sent by the second wireless communication transceiver by directly using the first wireless communication transceiver if the coupled second wireless communication transceiver is sensed by the first wireless communication transceiver, but the present disclosure is not limited thereto.

Figure 3:
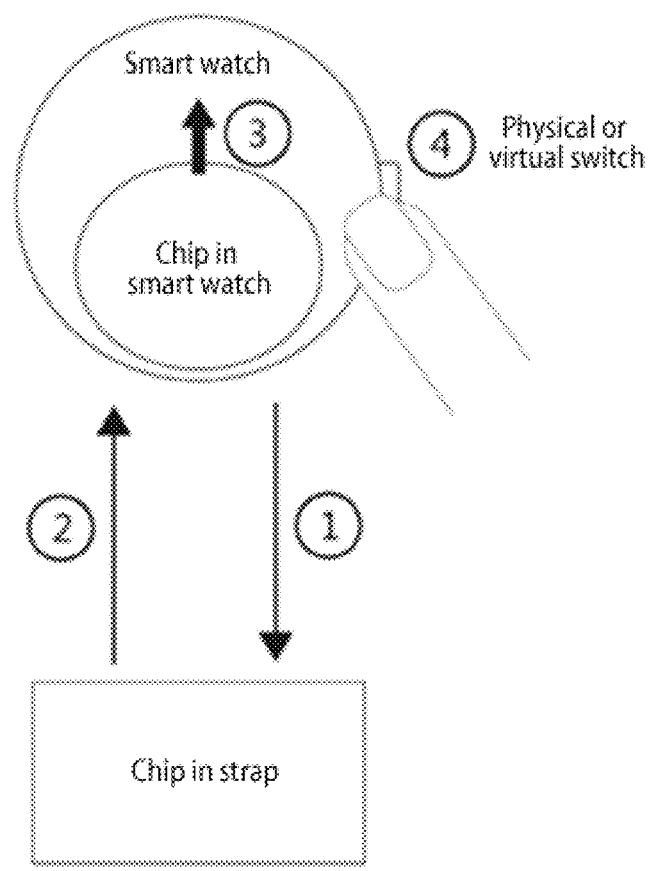
FIG. 3 is a schematic diagram of further another display interface switching method provided by an embodiment of the present disclosure.
Figure 4:
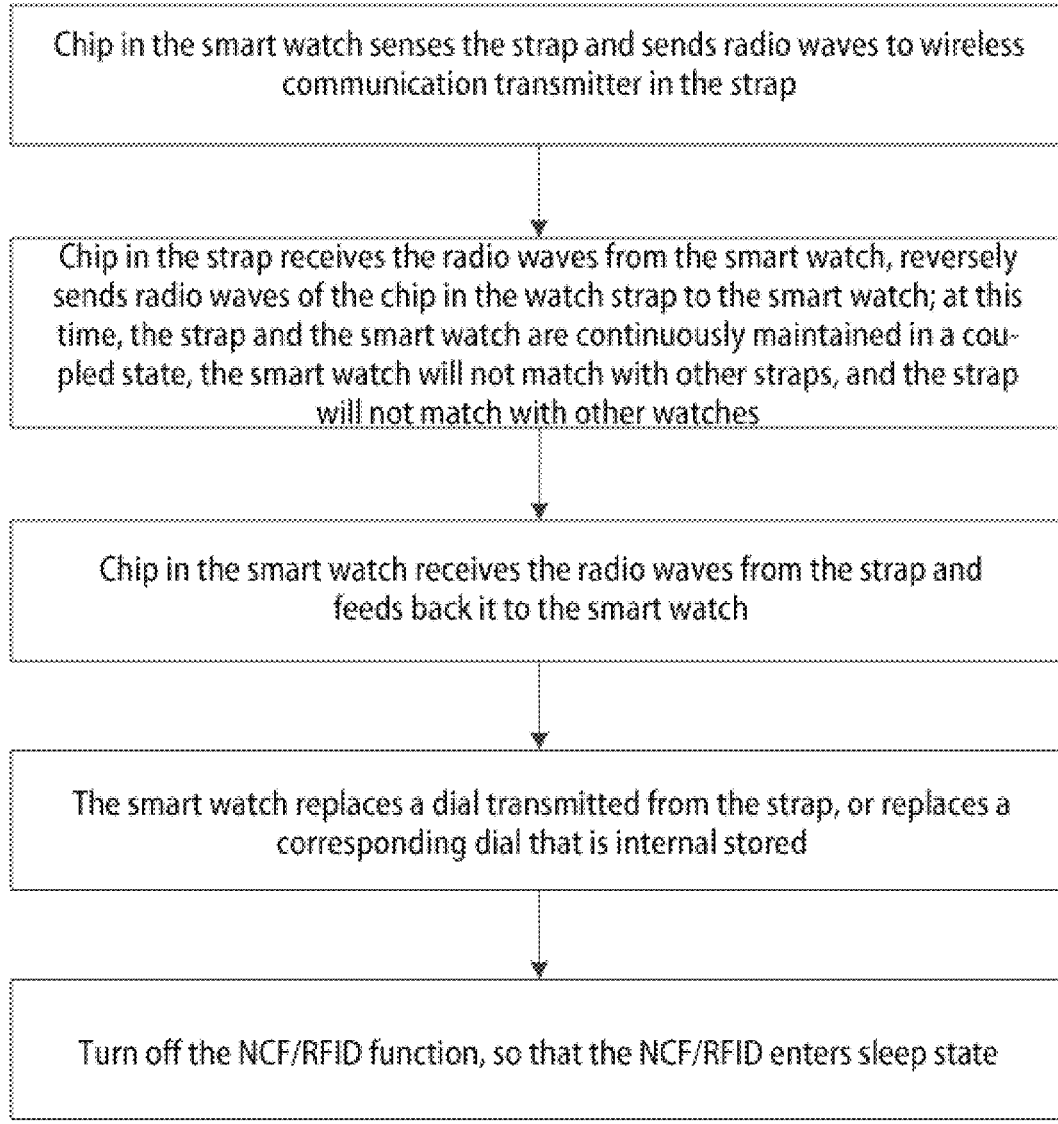
FIG. 4 is a schematic flowchart of the display interface switching method illustrated in FIG. 3.

Specifically, in the embodiment, the specific structure of the first wireless communication transceiver in the wearable device body is not limited. For example, the first wireless communication transceiver may comprise one wireless coil, that is, the first wireless communication transceiver is only used to realize a display interface switching function of the wearable device body. For example, one first wireless communication transceiver may be provided in the wearable device body to realize the display interface switching function of the wearable device body; or one first wireless communication transceiver and other wireless transceivers (such as NFC, RFID or NFMI communication transceivers, etc.) may be provided in the wearable device body to realize other functions (such as card swiping function) of the wearable device body by using other wireless transceivers. As illustrated in FIGS. 3-4, when the wearable device body is specifically a smart watch, in this step, after a chip (i.e. the first wireless communication transceiver) in the smart watch senses a chip (i.e. the second wireless communication transceiver) in the nearby strap (i.e. the wristband component), a radio wave signal corresponding to the interface information request may be sent to the chip in the watch strap, so that the chip in the strap can reversely send the radio wave signal corresponding to the stored interface information after receiving the radio wave signal, and thus the chip in the smart watch can obtain the interface information.

Figure 5:
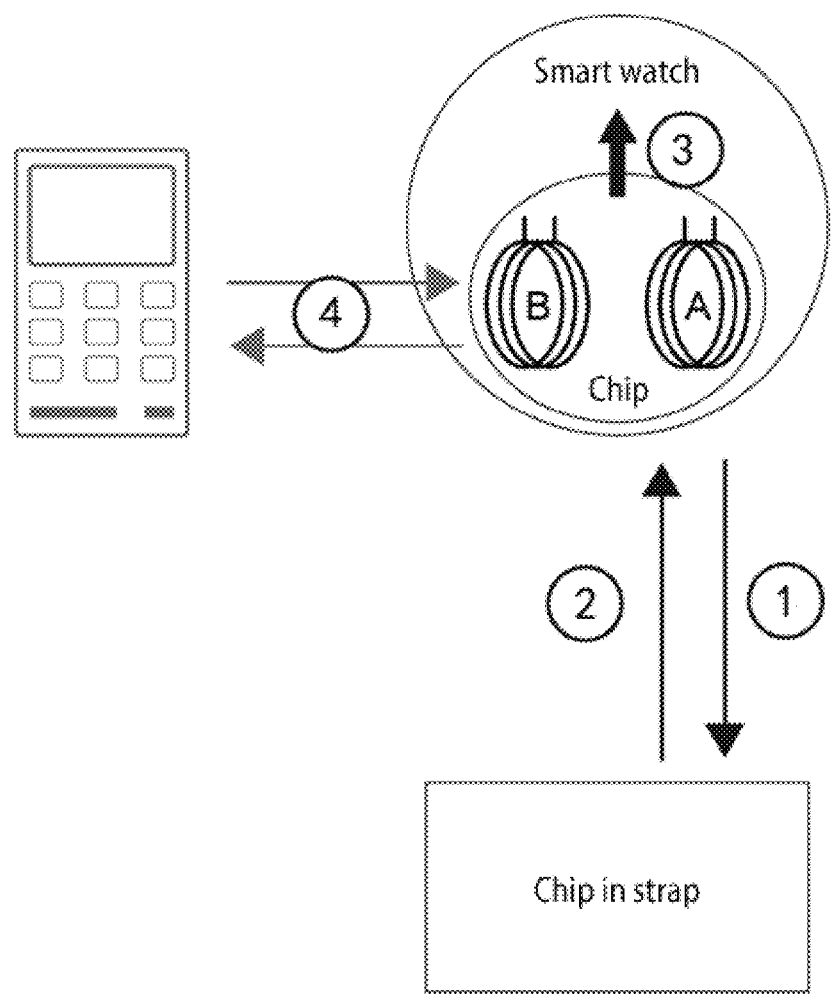
FIG. 5 is a schematic diagram of yet another display interface switching method provided by an embodiment of the present disclosure.
Figure 6:
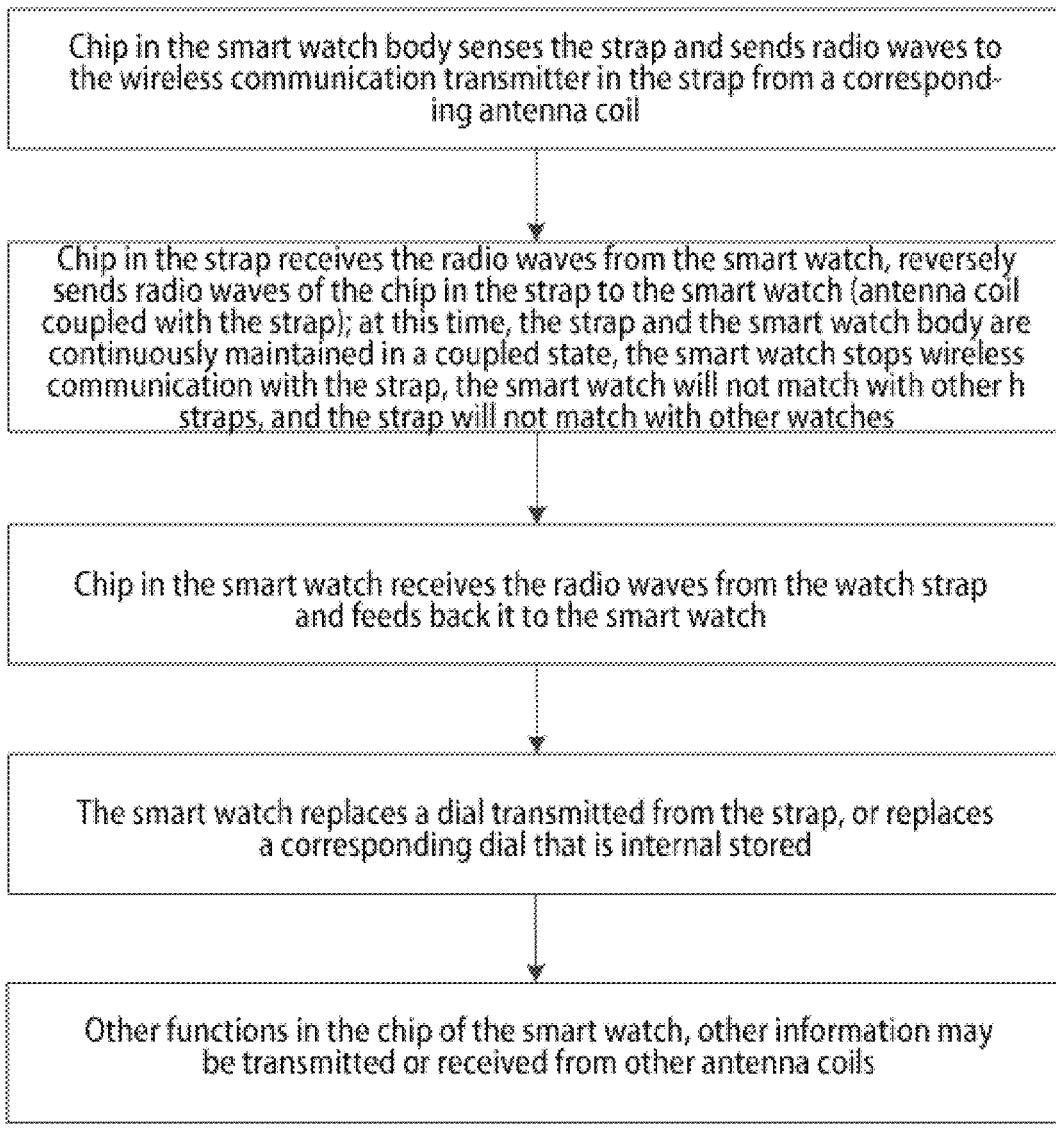
FIG. 6 is a schematic flowchart of the display interface switching method illustrated in FIG. 5.

Correspondingly, the first wireless communication transceiver may also comprise a plurality of wireless coils, that is, the first wireless communication transceiver may not only be used to realize the display interface switching function of the wearable device body, but also realize other functions of the wearable device body (such as card swiping function). That is, in this step, the wearable device body may send an interface information request to the second wireless communication transceiver by a target coil of the first wireless communication transceiver if the coupled second wireless communication transceiver is sensed by the target coil of the first wireless communication transceiver; wherein, the target coil is any one of wireless coils in the first wireless communication transceiver, and the wireless coil of the second wireless communication transceiver is coupled with the target coil. For example, the first wireless communication transceiver may be paired and communicated with the second wireless communication transceiver with a target frequency using the target coil, to realize the display interface switching function of the wearable device body, the first wireless communication transceiver may also be paired and communicated with external devices (such as card readers, bus flashing machines, attendance machines, etc.) with other frequencies using other coils other than the target coil, to realize other corresponding functions. As illustrated in FIGS. 5 and 6, when the wearable device body is specifically a smart watch, in this step, after a chip (i.e. the first wireless communication transceiver) in the smart watch senses a (i.e. chip the second wireless communication transceiver) in the nearby strap (i.e. the wristband component) by the target coil, a radio wave signal corresponding to the interface information request may be sent to the chip in the strap by the wireless coil (that is, the target coil) coupled with the strap, so that the chip in the watch strap may reversely send the radio wave signal corresponding to the stored interface information after receiving the radio wave signal, and thus the chip in the smart watch can obtain the interface information by the target coil. Correspondingly, other functions (such as card swiping function) of the chip of the smart watch may transmit or receive corresponding information by other wireless coils other than the target coil. For example, when the chip in the smart watch in FIG. 5 uses a wireless coil A as the target coil to be coupled with the chip in the strap to realize the display interface switching function, a wireless coil B may be used to transmit or receive other information to/from external devices (such as card readers, bus flashing machines, attendance machines, etc.) to realize other functions of the chip of the smart watch.

Correspondingly, the second wireless communication transceiver serving as the Tag may comprise one wireless coil to send the interface information to the first wireless communication transceiver serving as the Reader.

S102: switching a display interface of the wearable device body to an interface corresponding to the interface information.

Here, in this step, the display interface of the wearable device body may be an interface displayed on a display screen of the wearable device body, such as a dial displayed on a display screen of a smart watch. In this step, a processor of the wearable device body may switch the display interface to the interface corresponding to the interface information, so that the display interface of the wearable device body may be automatically switched to an interface corresponding to the wristband component, which improves the interchangeability of display interfaces of the wristband component and the wearable device body.

Specifically, in this step, the specific way for the processor of the wearable device body to switch the display interface of the wearable device body to the interface corresponding to the interface information may be set by the designer according to usage scenarios and user needs. For example, when the interface information is interface data, the processor may directly use the interface data to switch the display interface to the interface of the interface data; when the interface information is an interface identification, the processor may use the interface identification to search for interface data corresponding to the interface identification in a storage space of the wearable device body, and switch the display interface of the wearable device body to the interface of interface data; and when the interface information is interface download information, the processor may use the interface download information to download interface data corresponding to the interface download information from a network, or control a paired connected terminal (such as a mobile phone) to download interface data corresponding to the interface download information, so as to switch the display interface of the wearable device body to the interface of interface data. The processor in the embodiment is not limited, as long as it may use the acquired interface information to switch the display interface of the wearable device body to a corresponding interface.

Further, in the embodiment, after the processor of the wearable device body switches the display interface of the wearable device body to an interface corresponding to the interface information, the display interface switching function of the wearable device body may be turned off to turn off the communication between the first wireless communication transceiver and the second wireless communication transceiver. That is, since the first wireless communication transceiver (such as NFC communication transceiver or RFID communication transceiver) in the wearable device body often cannot completely shut down the power supply, that is, after the wearable device body uses the first wireless communication transceiver to couple with the second wireless communication transceiver in the nearby wristband component, as long as the wristband component is not separated from the wearable device body, the first wireless communication transceiver will continue to be coupled with the second wireless communication transceiver in the wristband component. Thus, after the display interface switching is completed, the processor may turn off the display interface switching function of the wearable device body, that is, turn off the communication between the first wireless communication transceiver and the second wireless communication transceiver, so that the first wireless communication transceiver becomes a standby state, and the coupling state between the target coil and the second wireless communication transceiver is maintained only with a weak current, thereby reducing the power consumption of the first wireless communication transceiver.

Specifically, the specific setting of the above-mentioned display interface switching function may be set by the designer himself. For example, the above-mentioned display interface switching function may be a wireless communication function of controlling the start or stop of the first wireless communication transceiver controlled by a physical switch or a virtual switch in the wearable device body, such as NFC function or RFID function as shown in FIG. 4. When the first wireless communication transceiver comprises a plurality of wireless coils, the above-mentioned display interface switching function may also be a separately set function of controlling the start or stop of the communication of the target coil in the first wireless communication transceiver controlled by a physical switch or a virtual switch in the wearable device body, and the embodiment is not limited thereto.

Correspondingly, in step 101, the processor of the wearable device body may, after the display interface switching function is activated and the first wireless communication transceiver is coupled with the second wireless communication transceiver in the wristband component, acquire interface information sent by the second wireless communication transceiver by using the first wireless communication transceiver. That is, the user may replace the wristband component required to use, and operate the physical switch or virtual switch in the wearable device body to turn on the display interface switching function, so that the wearable device body may switch the display interface from a corresponding interface of the wristband component before replacement to a corresponding interface of the wristband component after replacement.

Correspondingly, in the embodiment, after the processor of the wearable device body switches the display interface of the wearable device body to the interface corresponding to the interface information, closing information of the display interface switching function may also be display and output, so that the user may manually turn off the display interface switching function of the wearable device body. In the embodiment, the processor of the wearable device body may also turn off the display interface switching function of the wearable device body after obtaining the interface information sent by the second wireless communication transceiver, or display and output the turn off information of the display interface switching function.

Further, in the embodiment, after switching the display interface of the wearable device body to the interface corresponding to the interface information, the processor of the wearable device body may also detect whether the display interface has changed; if so, target interface information corresponding to the changed interface is acquired, and the target interface information is sent to the second wireless communication transceiver of the wristband component by using the first wireless communication transceiver, so as to replace the interface information stored in the wristband component with the target interface information.

Correspondingly, after switching the display interface of the wearable device body to the interface corresponding to the interface information, the processor of the wearable device body may detect whether the display interface changes within a preset time; if so, target interface information corresponding to the current display interface is acquired after the preset time, and the target interface information is sent to the second wireless communication transceiver of the wristband component by using the first wireless communication transceiver, and the display interface switching function of the wearable device body is turn off; if not, the display interface switching function of the wearable device body is turn off.

In the embodiment, the interface information sent by the coupled second wireless communication transceiver in the wristband component is received in a wireless transmission manner by using the first wireless communication transceiver disposed in the wearable device body, such that the wearable device body can automatically switch the display interface to an interface corresponding to the approaching coupled wristband component, thereby improving the interchangeability of display interfaces of the wristband component and the wearable device body, and thus improving the usage experience of a user.

Figure 7:
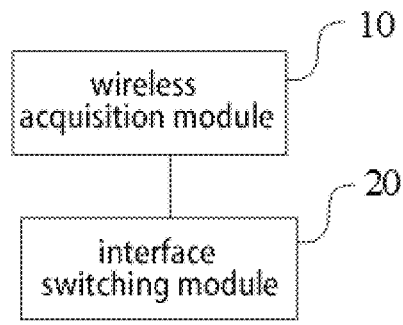
FIG. 7 is a structural block diagram of a display interface switching apparatus provided by an embodiment of the present disclosure.

Referring to FIG. 7, FIG. 7 is a structural block diagram of a display interface switching apparatus provided by an embodiment of the present disclosure. The display interface switching apparatus is applied to a wearable device body, and comprises:
  a wireless acquisition module 10 configured to couple a first wireless communication transceiver with a second wireless communication transceiver in a wristband component, for acquiring interface information sent by a second wireless communication transceiver in a wristband component, wherein the first wireless communication transceiver is disposed in the wearable device body; and
  an interface switching module 20 configured to switch a display interface of the wearable device body to an interface corresponding to the interface information.

Optionally, the wireless acquisition module 10 may comprise:
  a sending sub-module configured to send an interface information request to the second wireless communication transceiver by the first wireless communication transceiver if the coupled second wireless communication transceiver is sensed by the first wireless communication transceiver; and
  a receiving sub-module configured to receive the interface information sent back from the second wireless communication transceiver by using the first wireless communication transceiver.

Optionally, when the first wireless communication transceiver comprises a plurality of wireless coils, the sending sub-module may be specifically configured to send an interface information request to the second wireless communication transceiver by a target coil if the coupled second wireless communication transceiver is sensed by the target coil of the first wireless communication transceiver, wherein the target coil is any one of the plurality of wireless coils, and the second wireless communication transceiver is coupled with the target coil.

Optionally, when the interface information comprises an interface identifier, the interface switching module 20 may comprises:
  a search sub-module configured to search for interface data corresponding to the interface identifier in a storage space of the wearable device body; and
  a switching sub-module configured to switch the display interface of the wearable device body to an interface corresponding to the interface data.

Optionally, the apparatus may further comprise:
  a communication turn off module configured to, after the display interface of the wearable device body is switched to the interface corresponding to the interface information, turn off the display interface switching function of the wearable device body, so as to turn off the communication between the first wireless communication transceiver and the second wireless communication transceiver.

Optionally, the apparatus may further comprise:
  an update module configured to detect whether the display interface changes after the display interface of the wearable device body is switched to the interface corresponding to the interface information; if so, target interface information corresponding to the changed interface is acquired, and the target interface information is sent to the second wireless communication transceiver of the wristband component by using the first wireless communication transceiver, so as to replace the interface information stored in the wristband component with the target interface information.

In the embodiment, the interface information sent by the coupled second wireless communication transceiver in the wristband component is received in a wireless transmission manner by using the first wireless communication transceiver disposed in the wearable device body, such that the wearable device body can automatically switch a display interface to an interface corresponding to the approaching coupled wristband component, thereby improving the interchangeability of display interfaces of the wristband component and the wearable device body, and thus improving the usage experience of a user.

The present disclosure also provides a wearable device body, comprises a first wireless communication transceiver, a processor and a memory, wherein, the memory is configured to store a computer program, and the processor is configured to implement steps of the display interface switching method as described above when executing the computer program.

The present disclosure also provides a wristband component, comprises:

a second wireless communication transceiver configured to send stored interface information a first wireless communication transceiver in the wearable device body after the second wireless communication transceiver is coupled with the first wireless communication transceiver, so as to switch a display interface of the wearable device body to an interface corresponding to the interface information.

The present disclosure also provides a wearable device, which comprises the above-mentioned wearable device body and the above-mentioned wristband component.

Here, the wearable device in the embodiment may be specifically a smart watch. Correspondingly, the wearable device body in the embodiment may be specifically a dial body of a smart watch, and the wristband component in the embodiment may be specifically a replaceable strap for a smart watch.

Further, the present disclosure also provides a computer-readable storage medium, on which a computer program is stored, wherein when the computer program is executed by a processor, the steps of the above-mentioned display interface switching method are implemented. The computer-readable storage medium may comprise: U disk, mobile hard disk, read-only memory (ROM), random access memory (RAM), magnetic disk, optical disk, or other media that can store program codes.

The various embodiments in the present specification are described in a progressive manner, and each embodiment focuses on the differences from other embodiments, and the same and similar parts between the various embodiments can be referred to each other. As for the apparatus, wearable device body, wristband component, wearable device, and computer-readable storage medium disclosed in the embodiment, since it corresponds to the method disclosed in the embodiment, the description is relatively simple. For relevant parts, please refer to the description of the method.

A display interface switching method, a display interface switching method apparatus, a wearable device body, a wristband component, a wearable device and a computer-readable storage medium provided in the present disclosure have been introduced in detail above. Specific examples are used herein to illustrate the principles and implementations of the present disclosure, and the descriptions of the above embodiments are only used to help understand the methods and core ideas of the present disclosure. It should be pointed out that several improvements and modifications are possible to the application for those skilled in the art without departing from the principles of the present disclosure, and these improvements and modifications also fall within the protection scope of the claims of the application.

What is claimed is:

1. A display interface switching method, which is applied to a wearable device body, comprising:
coupling a first wireless communication transceiver with a second wireless communication transceiver in a wristband component, for acquiring interface information sent by the second wireless communication transceiver, wherein the first wireless communication transceiver is disposed in the wearable device body; and
switching a display interface of the wearable device body to an interface corresponding to the interface information.

2. The display interface switching method of claim 1, wherein coupling a first wireless communication transceiver with a second wireless communication transceiver in a wristband component, for acquiring interface information sent by the second wireless communication transceiver, comprises:
if the coupled second wireless communication transceiver is sensed by the first wireless communication transceiver, sending an interface information request to the second wireless communication transceiver by the first wireless communication transceiver; and
receiving the interface information sent back from the second wireless communication transceiver by using the first wireless communication transceiver.

3. The display interface switching method of claim 2, wherein when the first wireless communication transceiver comprises a plurality of wireless coils, if the coupled second wireless communication transceiver is sensed by the first wireless communication transceiver, sending an interface information request to the second wireless communication transceiver by the first wireless communication transceiver, comprises:
if the coupled second wireless communication transceiver is sensed by a target coil of the first wireless communication transceiver, sending the interface information request to the second wireless communication transceiver by the target coil, wherein the target coil is any one of the plurality of wireless coils, and the second wireless communication transceiver is coupled with the target coil.

4. The display interface switching method of claim 1, wherein when the interface information comprises an interface identifier, switching a display interface of the wearable device body to an interface corresponding to the interface information comprises:
searching for interface data corresponding to the interface identifier in a storage space of the wearable device body; and
switching the display interface of the wearable device body to an interface corresponding to the interface data.

5. The display interface switching method of claim 1, after switching a display interface of the wearable device body to an interface corresponding to the interface information, further comprising:
turning off a display interface switching function of the wearable device body, so as to turn off a communication between the first wireless communication transceiver and the second wireless communication transceiver.

6. A wearable device body, comprising a first wireless communication transceiver, a processor and a memory,
wherein the memory is configured to store a computer program, and
wherein the processor is configured to implement steps of the display interface switching method of claim 1 when executing the computer program.

7. A wearable device, comprising a wearable device body and a wristband component,
wherein the wearable device body comprises a first wireless communication transceiver, a processor and a memory, wherein the memory is configured to store a computer program, and wherein the processor is configured to implement steps of the display interface switching method of claim 1 when executing the computer program, wherein the wristband component comprises:

a second wireless communication transceiver configured to send stored interface information to a first wireless communication transceiver in a wearable device body after the second wireless communication transceiver is coupled with the first wireless communication transceiver, so as to switch a display interface of the wearable device body to an interface corresponding to the interface information.

8. A computer-readable storage medium, on which a computer program is stored, wherein when the computer program is executed by a processor, steps of the display interface switching method of claim 1 are implemented.

9. A display interface switching apparatus, which is applied to a wearable device body, comprising:

a wireless acquisition module configured to couple a first wireless communication transceiver with a second wireless communication transceiver in a wristband component, for acquiring interface information sent by a second wireless communication transceiver in a wristband component, wherein the first wireless communication transceiver is disposed in the wearable device body; and an interface switching module configured to switch a display interface of the wearable device body to an interface corresponding to the interface information.

10. A wristband component, comprising:

a second wireless communication transceiver configured to send stored interface information to a first wireless communication transceiver in a wearable device body after the second wireless communication transceiver is coupled with the first wireless communication transceiver, so as to switch a display interface of the wearable device body to an interface corresponding to the interface information.

* * * * *